United States Patent
Schultz et al.

(10) Patent No.: US 9,500,197 B2
(45) Date of Patent: Nov. 22, 2016

(54) PUMP ASSEMBLY WITH MULTIPLE GEAR RATIOS

(75) Inventors: John C. Schultz, Saline, MI (US); Philip C. Lundberg, Keego Harbor, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 670 days.

(21) Appl. No.: 13/475,559

(22) Filed: May 18, 2012

(65) Prior Publication Data
US 2013/0309104 A1    Nov. 21, 2013

(51) Int. Cl.
F04D 13/02 (2006.01)
F16H 61/00 (2006.01)
F16H 57/04 (2010.01)

(52) U.S. Cl.
CPC ......... *F04D 13/021* (2013.01); *F16H 57/0439* (2013.01); *F16H 61/0025* (2013.01)

(58) Field of Classification Search
CPC .......... F16H 3/72; F16H 57/0439; F15B 7/00; F04D 13/021
USPC ....... 417/362, 223, 319, 440, 441; 192/48.1, 192/48.4, 48.92, 66.2; 475/320, 314, 326
See application file for complete search history.

(56) References Cited

U.S. PATENT DOCUMENTS

| | | | |
|---|---|---|---|
| 5,289,741 A | 3/1994 | Debs et al. | |
| 5,454,764 A | 10/1995 | Koenig et al. | |
| 5,557,977 A * | 9/1996 | Stockton ...................... | 74/15.84 |
| 6,258,010 B1 | 7/2001 | Bai et al. | |
| 6,464,609 B1 | 10/2002 | Bai et al. | |
| 6,656,083 B2 * | 12/2003 | Esaki ............................. | 477/5 |
| 6,702,081 B2 | 3/2004 | Gorman et al. | |
| 6,964,631 B2 | 11/2005 | Moses et al. | |
| 7,136,735 B2 | 11/2006 | Carlson et al. | |
| 7,228,783 B2 | 6/2007 | Lochocki, Jr. et al. | |
| 7,281,904 B2 | 10/2007 | Schultz et al. | |
| 8,037,989 B2 | 10/2011 | Neelakantan et al. | |
| 8,105,049 B2 | 1/2012 | Schultz | |
| 2008/0051242 A1* | 2/2008 | Usoro ........................... | 475/5 |
| 2009/0209383 A1 | 8/2009 | Olson et al. | |
| 2010/0092310 A1* | 4/2010 | Robeck et al. ................. | 417/79 |
| 2010/0190606 A1 | 7/2010 | Moses et al. | |
| 2010/0304927 A1 | 12/2010 | Neelakantan et al. | |
| 2010/0326542 A1* | 12/2010 | Xie et al. ..................... | 137/487.5 |
| 2011/0027105 A1* | 2/2011 | Haupt et al. .................. | 417/53 |
| 2011/0040463 A1 | 2/2011 | Moses et al. | |
| 2011/0198179 A1 | 8/2011 | Lundberg et al. | |
| 2012/0269653 A1* | 10/2012 | Lutoslawski et al. ....... | 417/44.1 |

* cited by examiner

*Primary Examiner* — Alexander Comley
*Assistant Examiner* — Kenneth J Hansen

(57) ABSTRACT

A pump assembly for a vehicle transmission that is coupled to a prime mover, a chain drive assembly, a hydraulic pump with a rotor, and a planetary gear set. A drive sprocket of the chain drive assembly is rotationally coupled with the prime mover. The planetary gear set includes first, second, and third members. The first member is rotatable with the pump and the third member is rotatable with the driven sprocket.

14 Claims, 3 Drawing Sheets

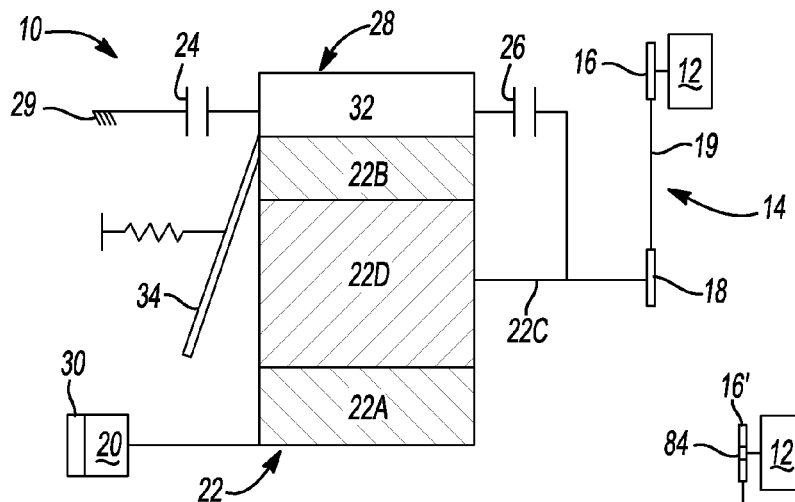
*Fig-1*
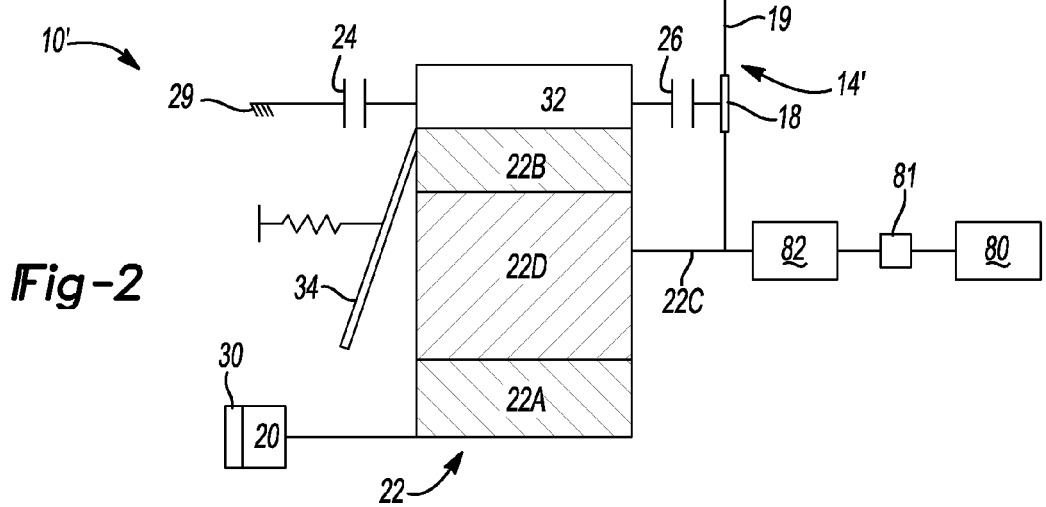
*Fig-2*
| Gear State | Torque Transmitting Devices | |
|---|---|---|
| | 24 | 26 |
| 1st | | X |
| 2nd | X | |
*Fig-3*

| Gear State | Torque Transmitting Devices | | | | | |
|---|---|---|---|---|---|---|
| | 124 | 126 | 128 | 130 | 132 | 134 |
| 1st | | X | O | X | X | |
| 2nd | X | | | X | X | |
| 3rd | X | O | X | | | X |
| 4th | | | | | X | X |

PUMP ASSEMBLY WITH MULTIPLE GEAR RATIOS

FIELD

The present disclosure relates to hydraulic pump assemblies for automatic motor vehicle transmissions and more particularly to off-axis pump assemblies that include multiple gear ratios.

BACKGROUND

The statements in this section merely provide background information related to the present disclosure and may or may not constitute prior art.

Many modern automatic motor vehicle transmissions utilize controlled hydraulic fluid (transmission oil) to actuate clutches and brakes to achieve desired combinations of engagements and provide a useful sequence of gear ratios. The control of such hydraulic fluid is achieved by a valve body which comprises a plurality of spool valves which direct hydraulic fluid flow through a complex of passageways to clutch and brake actuators. The valve body is supplied with pressurized hydraulic fluid from, typically, a gear or vane pump, which is driven by the engine output shaft or the transmission input shaft.

Because this is such a common transmission configuration and because of the manufacturing volume of such automatic transmissions, extensive research and development has been undertaken to reduce the cost and optimize the performance of such pumps. For example, simplifying such pumps to reduce their weight and cost, reducing their size to improve packaging, improving low speed performance, improving low temperature performance and reducing high speed energy losses have all been areas of development and improvement.

In particular, a typical transmission pump may be rotated at or near the same speed as the engine of the vehicle. The pumps are often sized to meet hydraulic pressure and volume demands of the transmission at low speed idle engine conditions. Friction forces inside the pump increase as the size of the pump increases. Accordingly, larger diameter higher displacement pumps that meet hydraulic demands of the transmission near engine idle speed often contribute to undesirable drag losses and decrease efficiency of the vehicle. These pumps provide much greater oil flow than what is consumed by the transmission at higher engine speeds, leading to loss in overall transmission efficiency.

The present invention is directed to improvements that reduce pump drag losses and improve transmission efficiency while meeting hydraulic demands of the transmission at engine idle speeds.

SUMMARY

A pump assembly for a vehicle transmission that is coupled to a prime mover includes a chain drive assembly, a hydraulic pump with a rotor, a planetary gear set, and first and second torque transmitting devices. The chain drive assembly includes a drive sprocket and a driven sprocket. The drive sprocket is rotationally coupled with the prime mover. The planetary gear set includes first, second, and third members. The first member is rotatable with the rotor of the hydraulic pump and the third member is rotatable with the driven sprocket of the chain drive assembly. The first torque-transmitting device is selectively engageable to interconnect the second member of the planetary gear set with a stationary member. The second torque-transmitting device is selectively engageable to interconnect one of the first, second, and third members with another of the first, second, and third members. The torque transmitting devices are engageable to establish at least a first and a second gear state. In the second gear state the rotor of the pump rotates at a rotational speed that is more than twice a rotational speed of the third member of the planetary gear set.

In another embodiment of the present invention, the first and second torque transmitting devices are cone clutches.

In yet another embodiment of the present invention, the pump assembly further includes a shifting device and a biasing member. The shifting device includes a first position where the first torque-transmitting device is disengaged and the second torque-transmitting device is engaged and a second position where the second torque-transmitting device is disengaged and the first torque-transmitting device is engaged. The biasing member urges the shifting device into the second position.

In yet another embodiment of the present invention, the pump includes a nozzle that reduces cavitation at high pump speeds.

In yet another embodiment of the present invention, the transmission has a predetermined hydraulic pressure and flow demand. The pump has a displacement that is less than the hydraulic flow demand of the transmission when the pump is operating at the speed of the prime mover of the vehicle at idle conditions.

In yet another embodiment of the present invention, the pump displaces less than ten cubic centimeters of hydraulic fluid per revolution of the rotor of the pump.

In yet another embodiment of the present invention, the first member of the planetary gear set is continuously directly connected with the rotor of the pump and the third member of the planetary gear set is continuously directly connected with the driven sprocket of the chain drive assembly.

In yet another embodiment of the present invention, the pump assembly further includes an electric motor, a first one-way clutch, and a second one-way clutch. The first one-way clutch is disposed between the electric motor and the third member of the planetary gear set and the second one-way clutch is disposed between the prime mover and the third member of the planetary gear set. The first and second one-way clutches are oriented so that the one of the prime mover and electric motor that has a higher rotational speed drives the third member of the planetary gear set.

In yet another embodiment of the present invention, the second one-way clutch is disposed on the drive sprocket of the chain drive assembly.

In yet another embodiment of the present invention, the pump assembly further includes an electric motor, a third torque transmitting device, a fourth torque transmitting device, a fifth torque transmitting device, and a sixth torque transmitting device. The third torque transmitting device is selectively engageable to connect the third member of the planetary gear set with the rotor of the pump, the fourth torque transmitting device is selectively engageable to connect the driven sprocket of the chain drive assembly with the third member of the planetary gear set, the fifth torque transmitting device is selectively engageable to connect the first member of the planetary gear set with the rotor of the pump, and the sixth torque transmitting device is selectively engageable to connect the electric motor with the first member of the planetary gear set.

In yet another embodiment of the present invention, the electric motor operates on about 12 volts.

In yet another embodiment of the present invention, the first member of the planetary gear set is a sun gear, the second member of the planetary gear set is a ring gear, and the third member of the planetary gear set is a carrier member.

In yet another embodiment of the present invention, the prime mover is an engine.

In yet another embodiment of the present invention, the second torque-transmitting device is selectively engageable to interconnect the second member of the planetary gear set with the third member of the planetary gear set.

In another embodiment of the present invention, a pump assembly for a vehicle transmission that is coupled to a prime mover includes a chain drive assembly, a hydraulic pump having a rotor, and a planetary gear set. The chain drive assembly includes a drive sprocket and a driven sprocket. The drive sprocket is rotationally coupled with the prime mover. The planetary gear set includes first, second, and third members. The first member is rotatable with the rotor of the hydraulic pump and the third member is rotatable with the driven sprocket of the chain drive assembly.

In yet another embodiment of the present invention, the second member of the planetary gear set is connected for rotation with a rotor of an electric motor.

In yet another embodiment of the present invention, the first member of the planetary gear set is a ring gear, the second member of the planetary gear set is a sun gear, and the third member of the planetary gear set is a carrier member.

In yet another embodiment of the present invention, the first member of the planetary gear set is a carrier member, the second member of the planetary gear set is a sun gear, and the third member of the planetary gear set is a ring gear.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a schematic view of a pump assembly incorporating principles of the present invention;

FIG. 2 is a schematic view of an alternative pump assembly incorporating principles of the present invention;

FIG. 3 is a clutch chart that further describes the pump assemblies of FIG. 1 and FIG. 2 according to principles of the present invention;

DETAILED DESCRIPTION

Figures 4, 5:
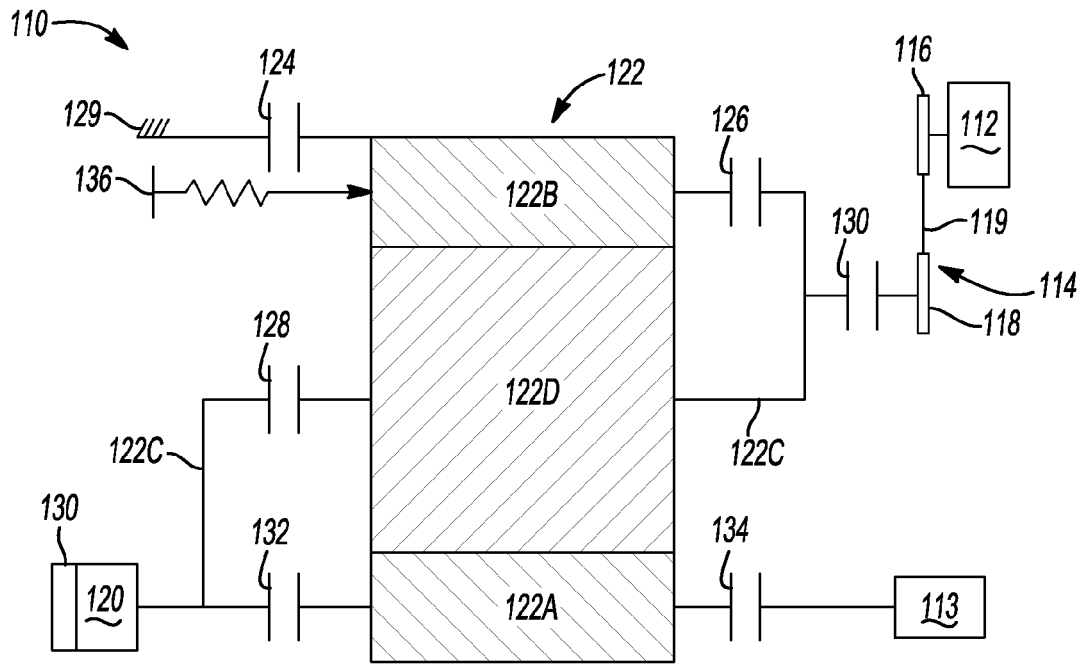
FIG. 4 is a schematic view of an alternative pump assembly incorporating principles of the present invention.
FIG. 5 is a clutch chart that further describes the pump assembly of FIG. 4 according to principles of the present invention.

The following description is merely exemplary in nature and is not intended to limit the present disclosure, application, or uses.

With reference to FIG. 1, a pump assembly for use in a motor vehicle is illustrated and generally designated by the reference number 10. The pump assembly 10 is driven by a prime mover 12 through a chain drive assembly 14. In the example provided, the prime mover 12 is a gasoline power plant. It should be appreciated that the prime mover 12 may have other configurations, such as a flex fuel, diesel, or hybrid power plant without departing from the scope of the present invention. The chain drive assembly 14 includes a drive sprocket 16 rotationally connected to the engine 12, a driven sprocket 18, and a chain 19 engaged with the drive sprocket 16 and the driven sprocket 18. The ratio of sprocket sizes may be varied to produce a slight rotational speed difference between the drive and driven sprockets 16, 18. Accordingly, the ratio of sprocket sizes may be adjusted to result in an underdrive ratio, direct drive ratio, or slight overdrive ratio to the pump 20 when the planetary gear set 22 is locked, as will be described below.

The pump assembly 10 includes a pump 20, a planetary gear set 22, a first torque-transmitting device 24, a second torque-transmitting device 26, and an actuator assembly 28. In the example provided, the pump assembly 10 is disposed inside a housing 29 of the transmission. The pump assembly 10 drives the pump 20 at different multiples of the prime mover 12 speed, as will be described below. The pump 20 may be any pump type without departing from the scope of the present invention. The pump 20 is sized to meet the hydraulic flow demands of the transmission when run at a multiple of prime mover 12 speed as provided by the pump assembly 10. In the example provided, the pump 20 is a gerotor pump that displaces hydraulic fluid at about 5 cc/rev. In an alternative embodiment, the pump 20 is a balanced vane pump that displaces hydraulic fluid at about 8 to 10 cc/rev. The pump 20 includes an annular nozzle 30 to limit cavitation at high speeds. The annular nozzle 30 is substantially as described in U.S. Pat. No. 7,281,904 issued Oct. 16, 2007 to Schultz et al., which is hereby incorporated by reference with respect to the technical features of the annular recess or nozzle. In an alternative embodiment, the nozzle is substantially as described in U.S. Pat. No. 8,105,049 issued Jan. 31, 2012 to Schultz, which is hereby incorporated by reference with respect to the technical features of the recess or nozzle.

The planetary gear set 22 includes a sun gear 22A, a ring gear 22B, a carrier member 22C, and a plurality of planet gears 22D supported by the carrier member 22C. The sun gear 22A is connected with a rotor of the pump 20 to rotate as a unitary rotary body. The carrier member 22C is rotationally connected with the driven sprocket 18 of the chain drive assembly 14 to rotate as a unitary body. The gearing of the planetary gear set 22 is preferably such that the sun gear 22A rotates at a multiple of about two to nine times the rotational speed of the carrier member 22C when the ring gear 22B is grounded. The speed multiple is selected to optimize the energy input for the selected pump type and transmission oil demand. In the example provided, the sun gear 22A rotates about 4.5 times faster than the rotational speed of the carrier member 22C, and therefore about 4.5 times faster than the prime mover 12. In the example provided, the planetary gear set 22 is incorporated into and disposed radially inward of the driven sprocket 18.

Those skilled in the art will recognize that other arrangements and connections of the planetary gear set 22 to the pump 20 and prime mover 12 are also possible without departing from the scope of the present invention. Additionally, other gear arrangements that do not include planetary gear sets are also possible that can meet the same goal of reducing pump losses and still meeting hydraulic demands by reducing the size of the pump and selectively driving the pump at speeds higher than the speed of the prime mover.

The first torque-transmitting device 24 selectively grounds or brakes the ring gear 22B of the planetary gear set 22 against a stationary member or the housing 29. The second torque-transmitting device 26 selectively connects the ring gear 22B with the carrier member 22C of the planetary gear set 22. In the example provided, the first and second clutches 24, 26 are cone clutches similar to manual transmission synchronizer cones. The cone clutches provide beneficial spin loss, packaging, and actuation characteristics. It should be appreciated that other types of clutches may be incorporated without departing from the scope of the present invention.

The actuator assembly 28 includes a shift fork 32 and a biasing member 34. The shift fork 32 includes a first position and a second position. In the first position, the shift fork 32 engages the second torque-transmitting device 26 and disengages the first torque-transmitting device 24 to connect the ring gear 22B and carrier member 22C for common rotation. Therefore, the planetary gear set 22 is locked into rotation as a single unit when the shift fork 32 is in the first position. Accordingly, the entire planetary gear set 22 and the rotor of the pump 20 rotate at the same rotational speed as the driven sprocket 18 to provide a direct drive or underdrive gear ratio between the prime mover 12 and the pump 20 for use at high engine speeds. In the second position, the shift fork 32 engages the first torque-transmitting device 24 and disengages the second torque-transmitting device 26 to ground the ring gear 22B against the stationary member or housing 29. Accordingly, the rotational speed of the sun gear 22A and rotor of the pump 20 are greater than the rotational speed of the carrier member 22C and driven sprocket 18 for use at low speeds of the prime mover 12. In the example provided, the second position of the shift fork 32 is selected at prime mover 12 speeds between idle conditions up to about 2000 revolutions per minute. It should be appreciated that the actual shift points of the pump assembly 10 may vary based on pump size, gearing ratio, desired pump output, or other factors without departing from the scope of the present invention. The biasing member 34 urges the shift fork 32 into the second position to produce the first gear ratio or direct drive for reduced parasitic losses in the first gear ratio. The shift fork 32 is preferably actuated by a hydraulic actuator (not shown) to achieve the second gear ratio. In an alternative embodiment, the shift fork 32 is passively controlled using a pressure regulator valve that shifts position to actuate the shift fork 32 when the pump 20 does not meet hydraulic flow demands.

Referring now to FIG. 2, an alternative pump assembly 10' is shown. The pump assembly 10' is similar to the pump assembly 10, where like numbers refer to like components. The pump assembly 10', however, includes a chain drive assembly 14', an electric motor 80, a gear set 81, and a one-way clutch 82. The gear set 81 generally reduces rotational speed and increases torque from the electric motor 80 to the planetary gear set. In the example provided, the gear set 81 is disposed between the electric motor 80 and the one-way clutch 82. In an alternative embodiment, the gear set 81 is disposed between the one-way clutch 82 and the planetary gear set 22. In another alternative embodiment, the gear set 81 is not included in the pump assembly. The chain drive assembly 14' includes a drive sprocket 16' that has a one-way clutch 84 disposed between the prime mover 12 and the chain 19. In the example provided, the one-way clutch 84 is integrated inside the drive sprocket 16' that is mounted to a torque converter hub (not shown). The one-way clutches 82, 84 are oriented so that the faster moving of the prime mover 12 and the electric motor 80 drives the carrier member 22C. Accordingly, the pump 20 may be operated in overdrive or direct drive conditions by either of the prime mover 12 or the electric motor 80 while the other is turned off. For example, when the prime mover 12 is turned off at a stoplight in an engine start-stop operation, the electric motor 80 may be used to operate the pump 20.

Referring now to FIG. 3, the operation of the pump assembly 10 and the pump assembly 10' will be described. It will be appreciated that pump assemblies 10, 10' are capable of transmitting torque from the prime mover 12 to the pump 20 in at least two speed ratios. FIG. 3 is a truth table presenting the various combinations of torque-transmitting devices that are activated or engaged to achieve the various gear states. An "X" in the box means that the particular clutch or brake is engaged to achieve the desired gear state. A blank box indicates that the particular clutch or brake is disengaged in the corresponding speed ratio. For example, to establish the first gear state, the second torque-transmitting device 26 is engaged and the first torque-transmitting device 24 is disengaged. To establish the second gear state, the first torque-transmitting device 24 is engaged and the second torque-transmitting device 26 is disengaged.

Referring now to FIG. 4, a pump assembly for use in a motor vehicle is illustrated and generally designated by the reference number 110. The pump assembly 110 is driven by a prime mover 112 through a chain drive assembly 114 and by an electric motor 113 in various modes of operation. In the example provided, the prime mover 112 is a gasoline power plant. It should be appreciated that the prime mover 112 may have other configurations, such as a flex fuel, diesel, or hybrid power plant without departing from the scope of the present invention. The electric motor 113 is preferably a relatively inexpensive motor that provides a high rotational speed and relatively low torque output. In the example provided the electric motor 113 is an induction motor that does not have permanent magnets. Additionally, the electric motor 113 preferably operates on a standard 12 volt automobile electrical system. The chain drive assembly 114 includes a drive sprocket 116 rotationally connected to the engine 112, a driven sprocket 118, and a chain 119 engaged with the drive sprocket 116 and the driven sprocket 118.

The pump assembly 110 includes a pump 120, a planetary gear set 122, a first torque transmitting device 124, a second torque transmitting device 126, a third torque transmitting device 128, a fourth torque transmitting device 130, a fifth torque transmitting device 132, a sixth torque transmitting device 134, and a biasing member 136. In the example provided, the pump assembly 110 is disposed inside a housing 129 of the transmission. The pump assembly 110 drives the pump 120 at different multiples of the prime mover 12 speed or the electric motor 113 speed, as will be described below. The pump 120 may be any pump type without departing from the scope of the present invention. The pump 120 is sized to meet the hydraulic flow demands of the transmission when run at a multiple of prime mover 112 rotational speed as provided by the pump assembly 110. In the example provided, the pump 120 is a gerotor pump that displaces hydraulic fluid at about 5 cc/rev and operates on a standard 12 volt bus of a vehicle. In an alternative embodiment, the pump 120 is a balanced vane pump that displaces hydraulic fluid at about 8 to 10 cc/rev. The pump 120 includes an annular nozzle 131 to limit cavitation at high speeds. The annular nozzle 30 is similar to the annular nozzle 30, as described above.

The planetary gear set 122 includes a sun gear 122A, a ring gear 122B, a carrier member 122C, and a plurality of planet gears 122D supported by the carrier member 122C. The first torque-transmitting device 124 is selectively engageable to ground or brake the ring gear 122B with a stationary member or the housing 129. The second torque-transmitting device 126 is selectively engageable to connect the ring gear 122B with the carrier member 122C. The biasing member 136 urges the second torque-transmitting device 126 to the engaged position and the first torque-transmitting device 124 to the disengaged position in a default condition. The third torque-transmitting device 128 is selectively engageable to connect the carrier member 122C with the rotor of the pump 120. The fourth torque-transmitting device 130 is selectively engageable to connect the driven sprocket 118 of the chain drive assembly 114 with the carrier member 122C. The fifth torque-transmitting device 132 is selectively engageable to connect the sun gear 122A with the rotor of the pump 120. The sixth torque-transmitting device 134 is selectively engageable to connect the sun gear 122A with the electric motor 113. In the example provided, the torque transmitting devices 124, 126, 128, 130, 132, 134 are cone clutches similar to manual transmission synchronizer cones. The cone clutches provide beneficial spin loss, packaging, and actuation characteristics. It should be appreciated that other types of clutches may be incorporated without departing from the scope of the present invention. Each of the torque transmitting devices 124, 126, 128, 130, 132, 134 is preferably actuated by a hydraulic actuator (not shown).

Referring now to FIG. 5, the operation of the embodiment of the pump assembly 110 will be described. It will be appreciated that pump assembly 110 is capable of transmitting torque from the prime mover 112 or the electric motor 113 to the pump 120 in various speed ratios. FIG. 5 is a truth table presenting the various combinations of torque-transmitting devices (shown in the top row) that are activated or engaged to achieve the various gear states (shown in the first column). An "X" in the box means that the particular clutch or brake is engaged to achieve the desired gear state. A blank box indicates that the particular clutch or brake is disengaged in the corresponding speed ratio. An "O" in the box indicates that the particular clutch or brake may be engaged or disengaged without changing the state of the pump assembly 110. For example, to establish the first gear state the second, fourth, and fifth torque transmitting devices 126, 130, 132 are engaged. The first state is an engine direct drive state where the pump 120 operates at about the same speed as the prime mover 112. To establish the second gear state the first, fourth, and fifth torque transmitting devices 124, 130, 132 are engaged. The second gear state is an engine overdrive state where the pump 120 runs faster than the prime mover 112. To establish the third gear state the first, third, and sixth torque transmitting devices 124, 128, 134 are engaged. The third gear state is a motor underdrive state where the pump 120 operates at a speed that is less than the speed of the electric motor 113 and torque is multiplied from the motor 113 to the pump 120. To establish the fourth gear state the fifth and sixth torque transmitting devices 132, 134 are engaged. The fourth gear state is a motor direct drive state where the pump 120 operates at about the same speed as the electric motor 113.

Figure 6:
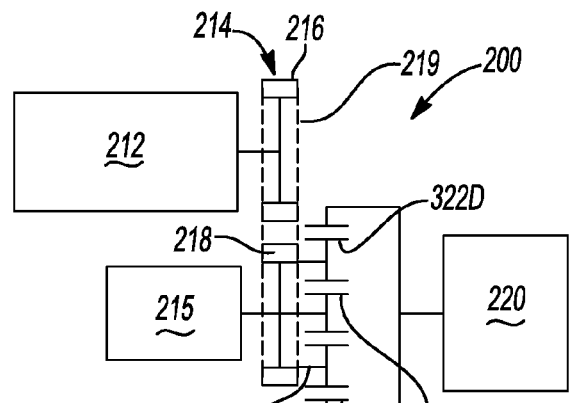
FIG. 6 is a schematic view of an alternative pump assembly incorporating principles of the present invention.

Referring now to FIG. 6, an embodiment of a pump assembly 200 is illustrated. The pump assembly 200 includes a prime mover 212, a chain drive assembly 214, an electric motor 215, a pump 220, and a planetary gear set 222. The prime mover 212 is similar to the prime movers 12, 112, the electric motor 215 is similar to the electric motors 80, 113, and the pump 220 is similar to the pumps 20, 120. The chain drive assembly 214 includes a drive sprocket 216 rotationally connected to the prime mover 212, a driven sprocket 218, and a chain 219 engaged with the drive sprocket 216 and the driven sprocket 218. The planetary gear set 222 includes a sun gear 222A, a ring gear 222B, a carrier member 222C, and a plurality of planet gears 222D supported by the carrier member 222C. The sun gear 222A is connected with a rotor of the electric motor 215, the carrier member 222C is rotationally connected with the driven sprocket 218 of the chain drive assembly 214, and the ring gear 222B is connected with a rotor of the pump 220. When operating the pump assembly 200, the prime mover 212 and the electric motor 215 are each able to independently or cooperatively drive the rotor or the pump 220. Additionally, the prime mover 212 restricts the carrier member 222C from rotating during a start-stop operation of the vehicle.

Figure 7:
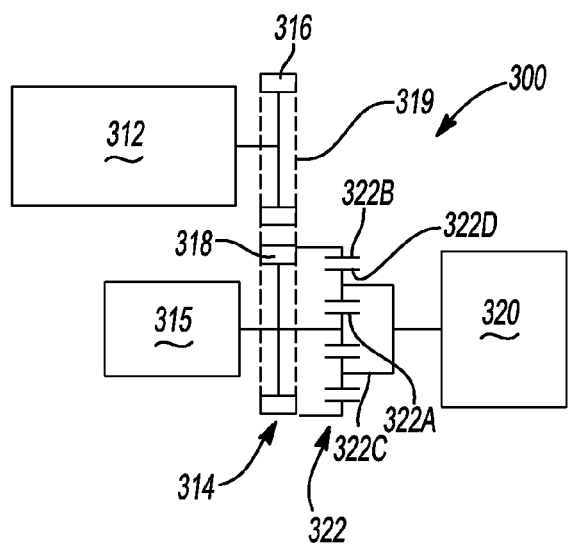
FIG. 7 is a schematic view of an alternative pump assembly incorporating principles of the present invention.
Figure 8:
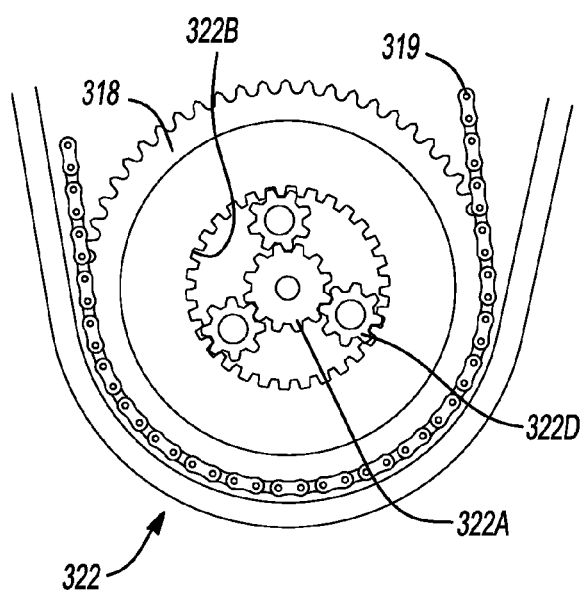
FIG. 8 is a partial cutaway view of the pump assembly of FIG. 7 according to principles of the present invention.

Referring now to FIG. 7 and FIG. 8, an embodiment of a pump assembly 300 is illustrated. The pump assembly 300 includes a prime mover 312, a chain drive assembly 314, an electric motor 315, a pump 320, and a planetary gear set 322. The prime mover 312 is similar to the prime movers 12, 112, 212, the electric motor 315 is similar to the electric motors 80, 113, 215, and the pump 320 is similar to the pumps 20, 120, 220. The chain drive assembly 314 includes a drive sprocket 316 rotationally connected to the prime mover 312, a driven sprocket 318, and a chain 319 engaged with the drive sprocket 316 and the driven sprocket 318. The planetary gear set 322 includes a sun gear 322A, a ring gear 322B, a carrier member 322C, and a plurality of planet gears 322D supported by the carrier member 322C. The sun gear 322A is connected with a rotor of the electric motor 315, the carrier member 322C is rotationally connected with a rotor of the pump 320, and the ring gear 322B is connected with driven sprocket 318 of the chain drive assembly 314. When operating the pump assembly 300, the prime mover 312 and the electric motor 315 are each able to independently or cooperatively drive the rotor or the pump 320. Additionally, the prime mover 312 restricts the ring member 322B from rotating during a start-stop operation of the vehicle.

The embodiments presented have several beneficial characteristics. By providing an operating condition that drives the pump several times faster than the engine, the size of the pump may be decreased and pump drag forces may be reduced. Additionally, in one embodiment, a small electric motor may drive the pump with an increase of torque and a decrease of speed through the planetary gear set. The torque multiplication enables use of a small 12 volt motor running at high speeds. Furthermore, if cold temperatures reduce the ability of the battery to supply current to the motor, then the pump may be run at a multiple of engine speed rather than by the motor.

The description of the invention is merely exemplary in nature and variations that do not depart from the gist of the invention are intended to be within the scope of the invention. Such variations are not to be regarded as a departure from the spirit and scope of the invention.

What is claimed is:

1. A pump assembly for a vehicle transmission that is coupled to a prime mover, the pump assembly comprising:
   a chain drive assembly including a drive sprocket and a driven sprocket, wherein the drive sprocket is rotationally coupled with the prime mover;

a hydraulic pump having a rotor;
a planetary gear set including a sun gear, a ring gear, and a planet carrier member, wherein the sun gear is directly connected for common rotation with the rotor of the hydraulic pump and the planet carrier member is rotatable with the driven sprocket of the chain drive assembly;
a first torque transmitting device selectively engageable to interconnect the ring gear of the planetary gear set with a stationary member; and
a second torque transmitting device selectively engageable to interconnect the ring gear of the planetary gear set with the driven sprocket, and
an electric motor, a speed reducing gear set, and a one-way clutch, and wherein the electric motor operatively drives an input member of the speed reducing gear set, an output member of the speed reducing gear set is interconnected for common rotation with the planet carrier member of the planetary gear set, and the one-way clutch is disposed between the electric motor and the speed reducing gear set,
wherein the torque transmitting devices are engageable to establish at least a first and a second gear state, and wherein in the second gear state the rotor of the pump rotates at a rotational speed that is more than twice a rotational speed of the planet carrier member of the planetary gear set.

2. The pump assembly of claim 1 wherein the first and second torque transmitting devices are cone clutches.

3. The pump assembly of claim 1 further including a shifting device and a biasing member, and wherein the shifting device includes a first position where the first torque transmitting device is disengaged and the second torque transmitting device is engaged and a second position where the second torque transmitting device is disengaged and the first torque transmitting device is engaged, and wherein the biasing member urges the shifting device into the second position.

4. The pump assembly of claim 1 wherein the pump includes a nozzle that reduces cavitation at high pump speeds.

5. The pump assembly of claim 1 wherein the transmission has a predetermined hydraulic pressure and flow demand, and wherein the pump has a displacement that is less than the hydraulic flow demand of the transmission when the pump is operating at the speed of the prime mover of the vehicle at idle conditions.

6. The pump assembly of claim 1 wherein the pump displaces less than ten cubic centimeters of hydraulic fluid per revolution of the rotor of the pump.

7. The pump assembly of claim 1 wherein the sun gear of the planetary gear set is continuously directly connected with the rotor of the pump and the planet carrier member of the planetary gear set is continuously directly connected with the driven sprocket of the chain drive assembly.

8. The pump assembly of claim 7 wherein the second one-way clutch is disposed between the prime mover and the planet carrier member of the planetary gear set, and the first and second one-way clutches are oriented so that the one of the prime mover and electric motor that has a higher rotational speed drives the planet carrier member of the planetary gear set.

9. The pump assembly of claim 8 wherein the second one-way clutch is disposed on the drive sprocket of the chain drive assembly.

10. The pump assembly of claim 1 further including a third torque transmitting device, a fourth torque transmitting device, a fifth torque transmitting device, and a sixth torque transmitting device, wherein the third torque transmitting device is selectively engageable to connect the third member of the planetary gear set with the rotor of the pump, the fourth torque transmitting device is selectively engageable to connect the driven sprocket of the chain drive assembly with the third member of the planetary gear set, the fifth torque transmitting device is selectively engageable to connect the first member of the planetary gear set with the rotor of the pump, and the sixth torque transmitting device is selectively engageable to connect the electric motor with the first member of the planetary gear set.

11. The pump assembly of claim 10 wherein the electric motor operates on about 12 volts.

12. The pump assembly of claim 1 wherein the prime mover is an engine.

13. The pump assembly of claim 1 wherein the second torque transmitting device is selectively engageable to interconnect the second member of the planetary gear set with the third member of the planetary gear set.

14. A pump assembly for a vehicle transmission that is coupled to a prime mover, the pump assembly comprising:
a prime mover;
a chain drive assembly including a drive sprocket and a driven sprocket, wherein the drive sprocket is rotationally coupled with the prime mover;
a hydraulic pump having a rotor;
a planetary gear set including a sun gear, a ring gear, and a planet carrier member, wherein the sun gear is directly connected for common rotation with the rotor of the hydraulic pump, and the planet carrier member is rotatable with the driven sprocket of the chain drive assembly;
a first torque transmitting mechanism for selectively connecting the ring gear to a stationary member;
a second torque transmitting mechanism for selectively connecting for common rotation the planet carrier to the ring gear;and
an electric motor, a speed reducing gear set, and a one-way clutch, and wherein the electric motor operatively drives an input member of the speed reducing gear set, an output member of the speed reducing gear set is interconnected for common rotation with the planet carrier member of the planetary gear set, and the one-way clutch is disposed between the electric motor and the speed reducing gear set.

* * * * *